June 8, 1937.    H. S. BLACK ET AL    2,083,495
ELECTRICAL INDICATING OR MEASURING SYSTEM
Filed Oct. 30, 1935
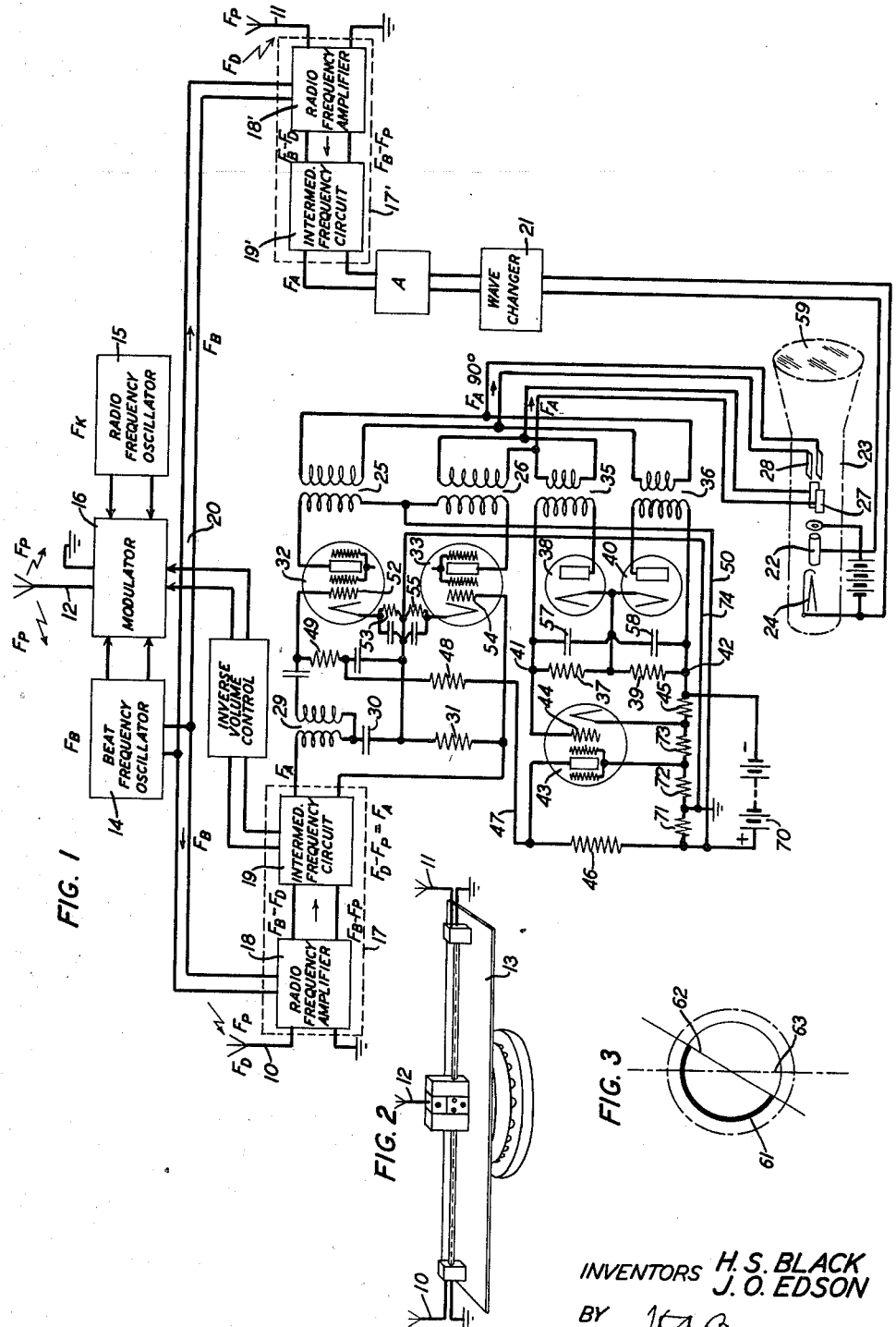
INVENTORS H. S. BLACK
J. O. EDSON
BY
ATTORNEY Patented June 8, 1937

2,083,495

UNITED STATES PATENT OFFICE 2,083,495

ELECTRICAL INDICATING OR MEASURING SYSTEM

Harold S. Black, Elmhurst, and James O. Edson, Great Kills, N. Y., assignors to Bell Telephone Laboratories, Incorporated, New York, N. Y., a corporation of New York Application October 30, 1935, Serial No. 47,400

6 Claims. (Cl. 178—44)

This invention relates to production or control of waves and to electrical indicating or measuring systems.

It is frequently desirable to produce, for example for utilization in such systems, two separate currents or waves of the same frequency and amplitude but with a fixed phase difference such as 90 degrees. Methods are available whereby the desired phase difference can be readily secured for a definite frequency but when the frequency is subject to variations these prior methods cause the amplitude of the two currents to vary differently with the frequency.

It is a primary object of this invention to produce, or supply for example to an electrical indicating or measuring system, two currents of the same frequency which do not vary substantially in amplitude or in their phase difference when the frequency is varied.

To mention one system where such current components may be utilized reference may be had to the radio direction finder disclosed in the copending application of H. T. Budenbom, Serial No. 741,372, filed August 25, 1934, wherein two components of the same frequency but with a phase difference of 90 degrees are employed to trace a circular pattern upon the screen of an oscillograph tube.

As an illustration of one embodiment of this invention an audio frequency source may be connected in series with a condenser and a resistance in such a manner that the voltage across the condenser lags behind the voltage across the resistance by 90 degrees to a degree of approximation that increases as the resistance is increased in value. But with such a circuit the amplitude of the current derived from the condenser is not independent of the frequency but over the range of frequencies from 10 to 10,000 cycles may vary as much as 60 decibels.

One way in which these two current components may be kept constant in amplitude with constant phase shift while the frequency is varied is by taking advantage of the fact that the current derived from the voltage across the terminals of the resistance is independent of the frequency. Thus, if the voltage across the condenser is applied to the input terminals of a vacuum tube amplifier and the voltage across the terminals of the resistance is applied to the input terminals of a second vacuum tube amplifier similar to the first amplifier the output current from the first amplifier will vary with the frequency while the output of the second amplifier will be independent of the frequency. It is, therefore, proposed that the amplitude of the output of the first amplifier be compared to the amplitude of the output from the second amplifier and the gain of the first amplifier varied until the amplitude difference is substantially zero. Since the frequency of the two waves is the same although with a phase difference of 90 degrees, a convenient way of making the comparison is to compare either the peak or rectified values or some function of the amplitude not involving phase. Thus, the output of each amplifier may be bridged by a step-up transformer leading to a diode rectifier. The outputs of the two rectifiers should be connected in series opposition so that their combined output is zero when the amplitudes are equal, but otherwise develops a potential proportional to the difference in the two amplitudes. The potential of the input electrode of the amplifier connected to the condenser may then be controlled in accordance with the combined rectifier output in such a manner as to hold the two current components substantially equal in amplitude.

Referring to the drawing,

Fig. 1 illustrates this invention as applied to a radio direction finding system;

Fig. 2 illustrates a rotatable structure on which the apparatus of Fig. 1 may be mounted; and Fig. 3 illustrates the type of indication produced by the cathode ray tube included in the system of Fig. 1.

The complete radio direction finding system of the above-mentioned Budenbom application is not disclosed in Fig. 1 as the present figure discloses only that portion of the system involving the use of two alternating currents in quadrature to trace a circular pattern on the screen of a cathode ray tube, which trace is modified to give the direction and sense of the radio signal under observation.

Antennas 10 and 11 are non-directional vertical receiving antennas while antenna 12 is a local transmitting antenna and all three antennas, as in the Budenbom application, may be mounted on a turntable comprising a platform 13 as in Fig. 2. Antenna 12 is positioned equally distant from and preferably in the same plane with antennas 10 and 11. Transmitting antenna 12 is connected to a heterodyne transmitter comprising a beat frequency oscillator 14, a substantially constant frequency oscillator 15, and a modulator 16. The receiving antennas 10 and 11 are connected to similar heterodyne receivers 17 and 17'. Each heterodyne receiver includes a radio frequency amplifier and first detector 18 or 18' and an intermediate frequency circuit 19 or 19' including a second detector. Beat frequency oscillator 14 supplies its frequency over line 20 to each of the heterodyne receivers 17 and 17'.

The low frequency output of radio receiver 17' passes through a suitable wave changer 21 to produce a square topped wave which is impressed upon the control electrode 22 of a cathode ray tube 23 to vary the intensity of the beam emitted from the cathode 24. The output of receiver 17 is impressed upon the phase splitting arrangement of this invention (to be described later) to produce in the output of transformer 25 a current which is shifted 90 degrees in phase with respect to the output of transformer 26. The in-phase current from transformer 26 is supplied to a pair of deflector plates 27 of tube 23 while the quadrature phase current from transformer 25 is supplied to plates 28 of the tube.

Assume that it is desired to determine the direction of an incoming wave of frequency $F_D$. The beat frequency oscillator 14 is tuned to generate a wave of high frequency $F_B$ and this frequency is supplied together with a frequency $F_K$ from oscillator 15 to modulator 16 for producing the difference frequency $F_P$ which frequency is smaller than the incoming frequency $F_D$ by an audio frequency $F_A$, the desired frequency of the detected currents; that is $P_P = F_D - F_A$. The wave of frequency $F_P$ arrives at antennas 10 and 11 in similar phase. Components of the wave of frequency $F_D$, which components are out of phase with respect to each other, are absorbed by antennas 10 and 11 and supplied with the wave of frequency $F_P$ to receivers 17 and 17'. In the radio frequency amplifier and first detector 18 and 18' of each receiver waves of frequencies $F_D$ and $F_P$ are subtracted from the beat frequency $F_B$ supplied over line 20 to produce two intermediate frequencies $F_B - F_P$ and $F_B - F_D$. In the intermediate frequency circuit 19, 19' of each receiver these two intermediate frequencies are combined to produce a detected current of a frequency equal to $F_B - F_P - (F_B - F_D) = F_D - F_P = F_A$. The two detected currents of frequencies $F_A$ will have the same relative phase relation as the components of the wave $F_D$ absorbed by the receiving antennas 10 and 11.

The current output from the receiver 17 is impressed upon a phase splitting network to obtain two components differing from each other by 90 degrees. This phase splitting network comprises autotransformer 29, condenser 30 and resistance 31. The secondary winding of transformer 29 and the condenser 30 are connected between the input electrodes of a vacuum tube amplifier 32 while the terminals of resistance 31 are connected to the input electrodes of a similar vacuum tube amplifier 33.

When a condenser and a resistance are connected in series with a source of voltage as is the case for condenser 30 and resistance 31 the potential across the condenser is substantially 90 degrees out of phase with the potential across the resistance, but the amplitude of the component derived from the condenser is not independent of the frequency as is the case for the component derived from resistance 31. It will be appreciated that it would be desirable to have some automatic means for holding these two components at equal amplitudes as the detected frequency $F_A$ varies within the audio range during the operation of the direction finding system, instead of relying upon the manual adjustment of the gain of amplifier 32 to secure the desired equality.

It will, therefore, be apparent that the current in the secondary windings of transformers 25, 26 will differ in phase by 90 degrees and while the output from transformer 26 will be substantially constant with frequency the output from transformer 25 will tend to change with the frequency. A part of this variation may be reduced by including autotransformer 29 in series with condenser 30 but even with this autotransformer included, the amplitude variation may be as high as 17 decibels over the frequency band from 35 to 8,000 cycles. In order to hold the two components at substantially the same amplitude the primary winding of a step-up transformer 36 is connected across the secondary winding of transformer 25 and the primary winding of a similar step-up transformer 35 is connected across the secondary winding of transformer 26. The secondary winding of transformer 35 is connected in series with a resistance 37 and a rectifier 38 while the secondary winding of transformer 36 is connected in series with a resistance 39 and a rectifier 40. It will be noted that the outputs of the two rectifiers are connected in series opposing so that there is zero potential across the points 41, 42 for equal amplitudes for the rectified current from the two rectifiers 38 and 40. Terminal 41 is connected to the grid electrode 44 and terminal 42 connected to the cathode of a direct current vacuum tube amplifier 43. It, therefore, follows that the output current of vacuum tube 43 will depend upon the potential difference across the terminal 41, 42.

A common source of voltage 70 is utilized to supply the normal grid and plate voltages for the three amplifier tubes 32, 33 and 43. Connected in series across the terminals of source 70 are resistances 71, 72, 73 and 45. The drop in potential across resistances 71, 72 and 73 supplies anode-cathode voltage for tube 43 while the normal negative bias on grid 44 is caused by the potential drop in resistance 45. The anodes and the cathodes of tubes 32 and 33 are connected respectively to the positive terminal and the negative terminal of resistance 71 by leads 50 and 74.

Located in the output circuit of tube 43 is a resistance 46 the negative terminal of which is connected by wire 47 and resistances 48, 49 to the grid electrode 52 of tube 32. Since the cathode of tube 32 is connected to the negative terminal of resistance 71 it follows that the potential of grid 52 due to connection 47 is the difference in the potential drop in resistances 46 and 71. The grid bias of tube 43 due to resistance 45 (with zero potential difference between terminals 41, 42) is preferably adjusted so that the potential drop across resistance 46 exceeds the potential drop across resistance 71 by an amount sufficient to make the bias voltage of grid 52 negative with respect to its cathode. The grid 52 also has a constant negative bias due to the potential drop across the terminals of a resistance 53 included in the plate circuit of tube 32 while the grid 54 of tube 33 has a normal negative bias due to a corresponding resistance 55.

With respect to further preferred adjustments of the phase splitting network and associated amplifiers, the value of resistance 31 of the network should be so proportioned with respect to condenser 30 and transformer 29 that the minimum voltage developed across the condenser and transformer is equal to that developed across the resistance. The relation between the condenser 30 and transformer 29 is that the capacity reactance at the lowest frequency in the band impressed on the network is equal to the mutual reactance of the transformer at the highest frequency in the band. Transformer 29 should be poled for phase reversals so that the mutual reactance is negative.

With the above proportioning of the phase splitting network it is desirable that the grid bias supplied to tube 43 by the IR drop across resistance 46 be such when no potential exists between terminals 41 and 42 that the plate current IR drop across resistance 46 will be sufficient to apply a bias to tube 32 which is somewhat more negative than the grid bias supplied to tube 33 by resistance 55. Thus when such a frequency is applied to the phase splitting network that the voltage across condenser 30 and transformer 29 is midway between its maximum and minimum values the gains of the two amplifiers 32 and 33 will be such as to give equal outputs to transformers 25, 26 and hence no control voltage will be developed between terminals 41, 42 in the output of the rectifier tubes.

If the applied frequency varies in such a manner that the output from transformer 25 tends to exceed that from transformer 26 there is a residual voltage between terminals 41, 42 which makes the grid of tube 43 less negative and causes the plate current of tube 43 to increase. This results in increased negative bias on grid 52 of tube 32 and reduces the gain of this amplifier tending to restore equality of the outputs of tubes 32 and 33. A similar effect but of opposite sign tends to preserve equality of outputs if the applied frequency varies in such a manner as to reduce to a value below average the voltage fed to tube 32 from the phase splitting network.

The residual inequality of the outputs of transformers 25, 26 may be reduced to almost any required value by increasing the step-up ratio of transformers 35, 36, the gain of the direct current amplifier 43 and the control sensitivity of tube 32, that is, its decibel change of gain per volt change of grid bias.

It will be apparent from the above description that amplifier tubes 32 and 33 should be identical. It is also desirable that tubes 32 and 33 work into a fairly low impedance such that variation in their anode and cathode impedances will not change the phase shift. A rather simple filtering circuit involving resistances 37, 39 and shunt condensers 57, 58 is employed in the output of rectifiers 38, 40 to suppress any alternating current present. An elaborate filtering circuit is not advisable as the time constant of the control circuit between transformers 35, 36 and resistance 46 must be kept fairly low in order to prevent hunting or low frequency singing.

It will also be apparent that if desired other amplifiers may be included between tubes 32, 33 and output transformers 25, 26 if the single amplifiers shown are insufficient to produce the desired gain.

The manner in which the pattern on the screen 59 of the cathode ray tube is varied to indicate the direction of the radio signal received by antennas 10 and 11 may now be explained. As previously stated, the in-phase current component from transformer 26 and the quadrature phase component from transformer 25 are impressed upon the deflector plates 27, 28 to give a circular trace of the cathode ray beam on screen 59 as shown by the trace 61 of Fig. 3. However, the in-phase detected current received by antenna 11 is sent through a wave changer 21 to produce a square topped wave such that during one-half of its cycle the biasing potential on control electrode 22 of cathode ray tube 23 will be reinforced and during the other half-cycle will be diminished. Hence, the intensity of the circular cathode ray tube trace will be correspondingly increased through one half of its excursion and decreased during the other half. Assuming that the common diameter 62 of the semi-circular trace so obtained coincides with the reference line 63 when the detected current $F_A$ from antenna 11 agrees in phase with the in-phase component of the detected current $F_A$ from antenna 10, the orientation actually observed at any position of turntable 13 of the common diameter 62 with respect to said reference line 63 will be an indication of the direction and the directional sense of the incoming wave with respect to the plane of antennas 10 and 11. Since the orientation or compass bearing of the plane of the antennas may be easily determined the bilateral direction and compass directional sense of the incoming wave may be determined.

What is claimed is:

1. In combination, means for producing a wave of a certain frequency but subject to frequency variation with time, means for producing a wave of the same frequency but having a fixed phase difference from said first wave, said first wave being subject to amplitude variations relative to said second wave as the frequency is varied and means responsive to said relative variations for controlling the amplitude of said first wave.

2. In combination, means for producing a wave of a certain frequency but subject to frequency variations with time, means for producing a wave of the same frequency but having a fixed phase difference from said first wave, said first wave being subject to amplitude variations relative to said second wave as the frequency is varied, and means responsive to the difference between the amplitudes of said two waves for holding their said amplitudes at substantially the same value when their frequency is changed.

3. In combination, a source of an audio frequency, a phase splitting network for deriving from said source a first current wave and a second current wave of the same frequency but having a substantially fixed phase difference as the frequency of said source is varied, said first wave being subject to amplitude variations relative to said second wave as the frequency is varied, a vacuum tube amplifier responsive to said first wave, a second vacuum tube amplifier responsive to said second wave, and means controlled by said amplifiers for causing the output current of said amplifiers to be substantially equal as the frequency of said source is varied over a wide range of audio frequencies.

4. In combination, a source of an audio frequency, a phase splitting network for deriving from said source a first current wave and a second current wave of the same frequency but having a substantially fixed phase difference as the frequency of said source is varied, said first wave being subject to amplitude variations as the frequency is varied, said second wave having an amplitude substantially independent of the frequency, a vacuum tube amplifier responsive to said first current wave, a second vacuum tube amplifier responsive to said second current wave, each of said amplifiers having a control electrode, and means responsive to the difference in amplitude of the output currents of said amplifiers for holding substantially constant the amplitude of the output of said first amplifier.

5. In combination, a source of an audio frequency, a phase splitting network for deriving from said source a first current wave and a second current wave of the same frequency but having a substantially fixed phase difference as the frequency of said source is varied, said first wave being subject to amplitude variations as the frequency is varied, the amplitude of said second wave being substantially independent of the frequency, a vacuum tube amplifier responsive to said first wave, a second vacuum tube amplifier responsive to said second wave, each of said amplifiers having a control electrode, a rectifier bridged across the output of said first amplifier, a second rectifier bridged across the output of said second amplifier, and means for controlling the potential of the control electrode of said first amplifier in accordance with the difference in the output currents of said two rectifiers.

6. In combination, a source of an audio frequency, a phase splitting network for deriving two separate currents from said source of the same frequency but with a substantially fixed phase difference of 90 degrees even when the frequency of said source varies over a wide range, one of said current components having an amplitude substantially independent of frequency, the second of said current components having an amplitude depending upon the frequency of said source, a vacuum tube amplifier for amplifying said first current component, a vacuum tube amplifier for amplifying said second current component, each of said amplifiers having a control electrode, means for deriving a direct current of an amplitude proportional to the output current of said first amplifier, means for deriving a direct current of a magnitude proportional to the output of said second amplifier, and means for impressing upon the control electrode of said first amplifier a potential proportional to the difference in said two direct currents for reducing the variation with frequency of the output of said first amplifier.

HAROLD S. BLACK.
JAMES O. EDSON.